(12) United States Patent
Johnson et al.

(10) Patent No.: US 8,531,842 B2
(45) Date of Patent: Sep. 10, 2013

(54) DISPLAY MODULE

(75) Inventors: Michiko Johnson, Machida (JP);
 Kiyofumi Sakaguchi, Mobara (JP);
 Takanori Suzuki, Tokyo (JP); Masashi Kitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 212 days.

(21) Appl. No.: 12/855,593

(22) Filed: Aug. 12, 2010

(65) Prior Publication Data
 US 2011/0043981 A1 Feb. 24, 2011

(30) Foreign Application Priority Data

Aug. 19, 2009 (JP) .................................. 2009-190064

(51) Int. Cl.
 *H05K 7/00* (2006.01)
(52) U.S. Cl.
 USPC ........................... 361/728; 361/803; 361/712
(58) Field of Classification Search
 USPC ......... 361/728–730, 807, 810, 701, 712–713, 361/752, 803
 See application file for complete search history.

(56) References Cited

U.S. PATENT DOCUMENTS

| | | | | |
|---|---|---|---|---|
| 6,037,026 A * | 3/2000 | Iwamoto | ...................... | 428/41.3 |
| 7,737,933 B2 * | 6/2010 | Yamano et al. | .................. | 345/94 |
| 7,892,385 B2 * | 2/2011 | Baek et al. | ...................... | 156/249 |
| 8,067,294 B2 * | 11/2011 | Takayama et al. | ............. | 438/458 |
| 8,269,732 B2 * | 9/2012 | Kwon | ............................ | 345/173 |
| 2005/0191485 A1 * | 9/2005 | Kitano et al. | .................. | 428/343 |
| 2006/0152648 A1 * | 7/2006 | Kim et al. | ........................ | 349/58 |
| 2006/0164860 A1 * | 7/2006 | Muraoka et al. | .............. | 362/607 |
| 2007/0025121 A1 * | 2/2007 | Harada et al. | ................. | 362/607 |
| 2008/0203880 A1 * | 8/2008 | Kim | ................................ | 313/45 |
| 2009/0154198 A1 * | 6/2009 | Lee et al. | ....................... | 362/624 |
| 2011/0187960 A1 * | 8/2011 | Kobayashi et al. | ............. | 349/58 |
| 2012/0314176 A1 * | 12/2012 | Tsuchiya et al. | .............. | 349/153 |

FOREIGN PATENT DOCUMENTS

| | | |
|---|---|---|
| CN | 1549962 A | 11/2004 |
| EP | 1422602 A1 * | 5/2004 |
| JP | 8-327975 A | 12/1996 |
| JP | 2003-029644 A | 1/2003 |
| JP | 2009-155503 A | 7/2009 |

* cited by examiner

*Primary Examiner* — Hung S Bui

(74) *Attorney, Agent, or Firm* — Canon U.S.A, Inc. IP Division

(57) ABSTRACT

A display module includes a display panel, a unit disposed on an outer side of the display panel, and an adhesive sheet with which the display panel and the unit are stuck together. The adhesive sheet has a first adhesive surface adhering to the display panel and a second adhesive surface adhering to the unit. The edge of the first adhesive surface and the edge of the second adhesive surface are displaced from each other in the adhesive surface direction.

10 Claims, 7 Drawing Sheets

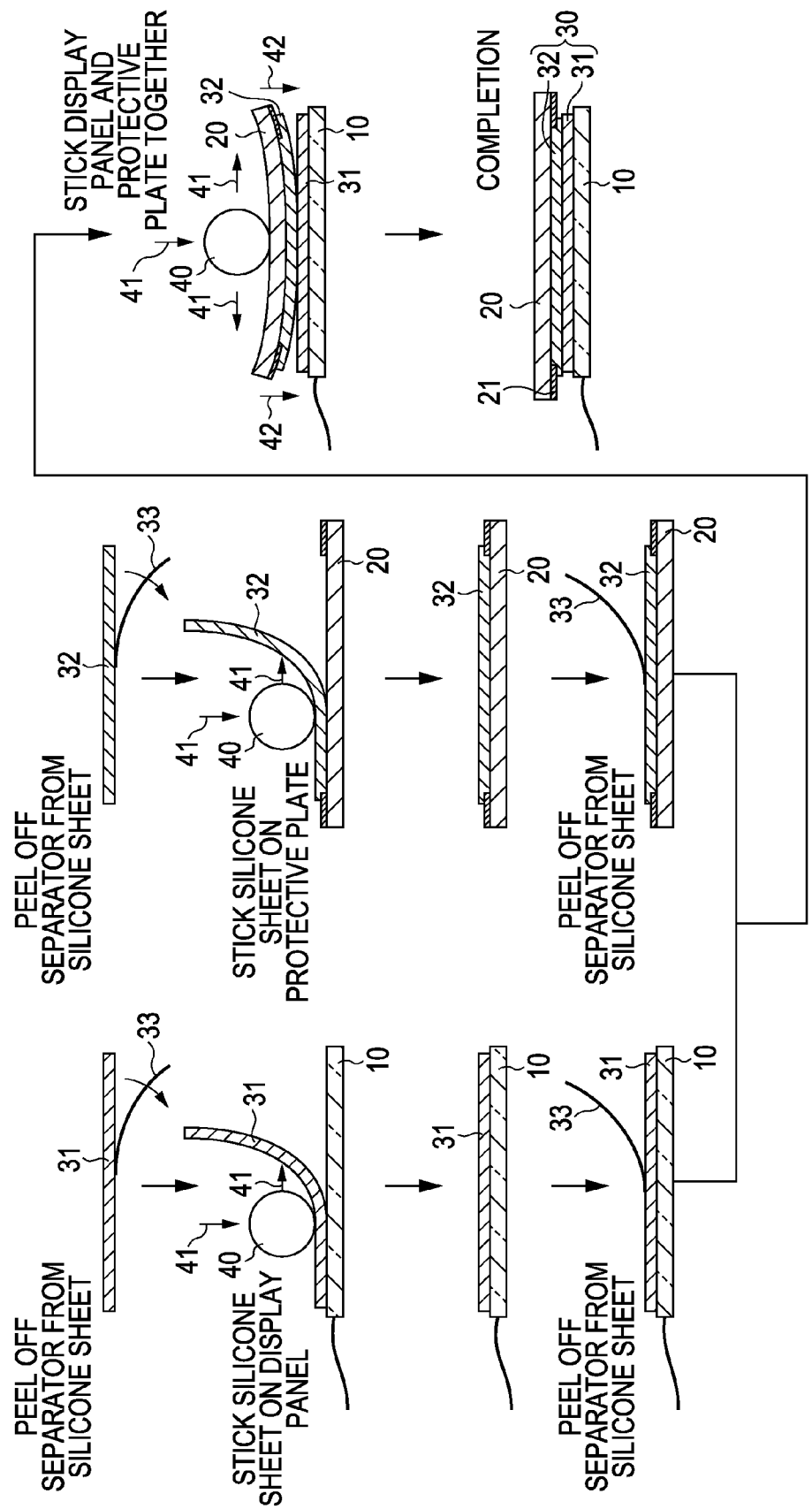

DISPLAY MODULE

BACKGROUND OF THE INVENTION

1. Field of the Invention

The present invention relates to a display module used as a display device in a game machine, a digital camera, a portable terminal, or the like.

2. Description of the Related Art

In general, when a display panel such as a liquid crystal display panel (LCD) is incorporated into a product, a window that is a transparent plate is provided in the exterior of the product, and the display panel is disposed on the inner side thereof. This window functions as a protective plate that prevents the display panel from being damaged. Such a structure is used typically in digital cameras and mobile phones. In some game machines and portable terminals, a touch panel unit is disposed on the front side of a display panel.

When a display panel and a protective plate, or a display panel and a touch panel unit are disposed with an air layer therebetween, a reflecting surface due to the difference in refractive index is formed at the interface between a gas layer (air layer) and a solid layer (display panel, protective plate, touch panel unit). The formation of the reflecting surface decreases the visibility of the display panel. For example, the reflection of external light from the reflecting surface decreases the contrast of the display image, or the background mirrored in the reflecting surface overlaps the display image.

As a means to prevent the reflection at the interface between a gas layer and a solid layer, for example, a display device in which a display panel and a transparent protective plate are stuck together with at least one layer of transparent adhesive material therebetween is proposed (see Japanese Patent Laid-Open No. 2003-29644).

In addition, a display device in which a display panel and a tablet unit are stuck together with a transparent resin sheet therebetween, the adhesive power of the transparent resin sheet is 200 g/20 mm or less, and therefore the display panel and the tablet unit can be peeled and replaced is proposed (see Japanese Patent Laid-Open No. 8-327975).

Conventional display devices are disadvantageous in that if the display panel, protective plate, or touch panel unit (tablet unit) is damaged and repaired, the transparent adhesive material or transparent resin sheet needs to be removed and stuck again, and this increases the cost of replacement. That is to say, the transparent adhesive material or transparent resin sheet provided to improve the visibility causes a decrease in ease of assembling and disassembling in replacement work.

SUMMARY OF THE INVENTION

In an aspect of the present invention, a display module includes a display panel, a unit disposed on an outer side of the display panel, and an adhesive layer disposed between the display panel and the unit. A first edge of an adhesive surface of the adhesive layer adhering to the display panel and a second edge of an adhesive surface of the adhesive layer adhering to the unit are displaced from each other in an adhesive surface direction.

Further features of the present invention will become apparent from the following description of exemplary embodiments with reference to the attached drawings.

BRIEF DESCRIPTION OF THE DRAWINGS

FIG. 1A is an exploded perspective view, FIG. 1B is a sectional view, FIG. 1C is a plan view showing the arrangement of two sheets, and FIG. 1D is a sectional view of another form of a display module.

FIG. 2A is a schematic view in the case where the sheet is adhering to the display panel. FIG. 2B is a schematic view in the case where the sheet is adhering to the unit.

FIG. 3A is a sectional view, FIG. 3B is a plan view showing the arrangement of two sheets, and FIG. 3C is a schematic view showing the state of the interface at which the sheet is peeled in the case of the removal of the display panel.

FIG. 4A is a sectional view, and FIG. 4B is a plan view.

FIG. 5A is a schematic view in the case where the sheet is adhering to the unit. FIG. 5B is a schematic view in the case where the sheet is adhering to the display panel.

FIG. 6A is an exploded perspective view, and FIG. 6B is a sectional view.

FIG. 7 is an explanatory view showing a process for sticking adhesive sheets together.

DESCRIPTION OF THE EMBODIMENTS

The embodiments of the present invention will now be described with reference to the drawings. However, the present invention is not limited to these embodiments.

First Embodiment

Figure 1A:
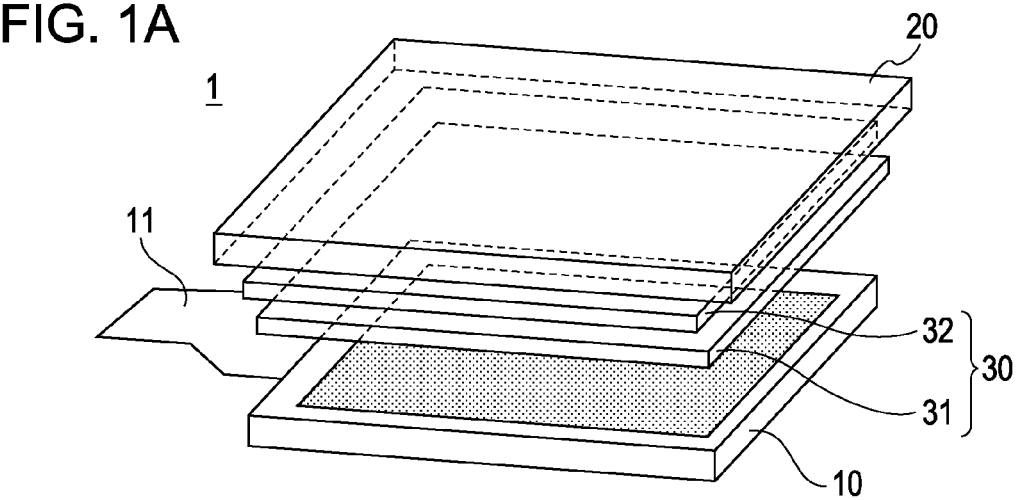
FIGS. 1A to 1D show a display module of a first embodiment.
Figure 1B:
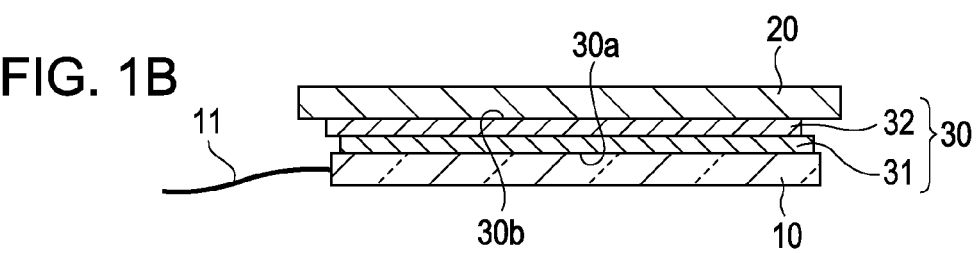
Figure 1C:
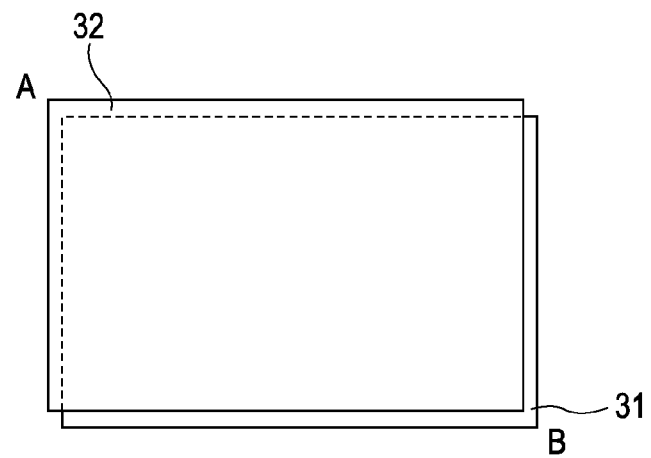
Figure 1D:
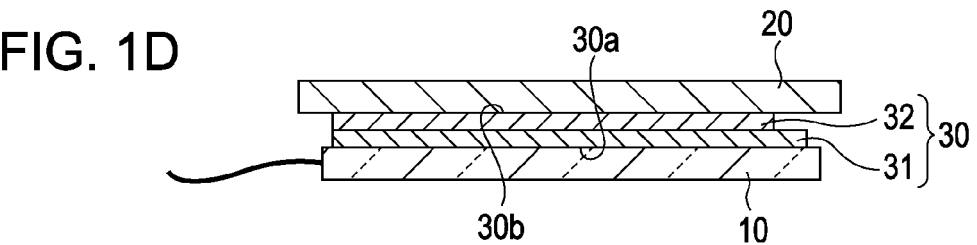

A display module according to a first embodiment of the present invention will be described with reference to FIGS. 1A to 1D. FIGS. 1A to 1D show a display module of a first embodiment. FIG. 1A is an exploded perspective view, FIG. 1B is a sectional view, and FIG. 1C is a plan view showing the arrangement of two sheets.

The display module 1 of the first embodiment shown in FIGS. 1A to 1D has a display panel 10 that displays letters and images, a unit 20 that is disposed on the outer side of the display panel 10, and an adhesive layer that is disposed between the display panel 10 and the unit 20 and in contact with each of them.

The display panel 10 is, for example, a liquid crystal display panel (LCD) or an organic light emitting diode display panel. From one edge thereof extends a flexible printed circuit (FPC) 11 for connecting to a substrate (not shown).

In the present invention, the unit 20 is a concept including a protective plate that is disposed on the outer side in order to protect the display panel 10 and that is made of transparent glass, transparent plastic, or the like, a touch panel unit, and a tablet unit. When the display panel 10 is disposed in the front of an apparatus such as a game machine, the unit 20 is disposed in front of the display panel 10. When the display panel 10 is disposed in the back of an apparatus such as a digital camera, the unit 20 is disposed behind the display panel 10.

The adhesive layer (for example, adhesive sheet 30) has a first adhesive surface 30a adhering to the display panel 10 and a second adhesive surface 30b adhering to the unit 20, and the edge of the first adhesive surface 30a and the edge of the second adhesive surface 30b are displaced from each other in the adhesive surface direction. The term "adhesive surface direction" used herein means any direction parallel to the adhesive surfaces. The term "displaced from each other" means that two adhesive sheets (to be described below) are arranged in such a manner that the edge of the adhesive surface 30a and the edge of the adhesive surface 30b are not in alignment with each other. The adhesive sheet 30 is, for example, a transparent silicone sheet having adhesive surfaces on both sides. A transparent silicone sheet having, for example, a rubber hardness of 5 to 20 degrees, an adhesive power (measured by a peel test in a direction at a 90 degree angle) of 0.11 to 0.6 N/20 mm, a refractive index of approximately 1.5, and a transmittance of 90% or more in the visible light wavelength range (400 nm to 750 nm) is commercially available. Instead of a silicone sheet, a transparent acrylic sheet having adhesive surfaces on both sides can be used as the adhesive sheet 30.

Specifically, the adhesive layer 30 includes a plurality of adhesive sheets (i.e., the adhesive layer is formed by laminating a plurality of adhesive sheets). In this embodiment, it includes two sheets 31 and 32 stuck together (two-layered). In the two-layered adhesive sheet 30, the edge of the sheet (adhesive sheet) 31 adhering to the display panel 10 and the edge of the sheet (adhesive sheet) 32 adhering to the unit 20 are displaced from each other in the adhesive surface direction. That is to say, in the plan view of FIG. 1C, the corner A of the edge of the adhesive layer 32 adhering to the unit 20 is displaced obliquely upward, and the corner B of the edge of the adhesive layer 31 adhering to the display panel 10 is displaced obliquely downward. For this reason, as shown in FIGS. 1B and 1C, the two sheets 31 and 32 are arranged in such a manner that the four edges of the adhesive surface 30a of the sheet 31 are not in alignment with corresponding edges of the adhesive surface 30b of the sheet 32. Specifically, as shown in FIGS. 1B and 1C, the two sheets 31 and 32 are arranged in such a manner that the left, right, upper, and lower edges of the adhesive surface 30a of the sheet 31 are not in alignment with the left, right, upper, and lower edges of the adhesive surface 30b of the sheet 32. Therefore, at the left end of the sectional view of FIG. 1B, the edge of the adhesive layer 32 adhering to the unit 20 is located on the outer side in the adhesive surface direction, and at the right end of the sectional view of FIG. 1B, the edge of the adhesive layer 31 adhering to the display panel 10 is located on the outer side in the adhesive surface direction.

Figure 2A:
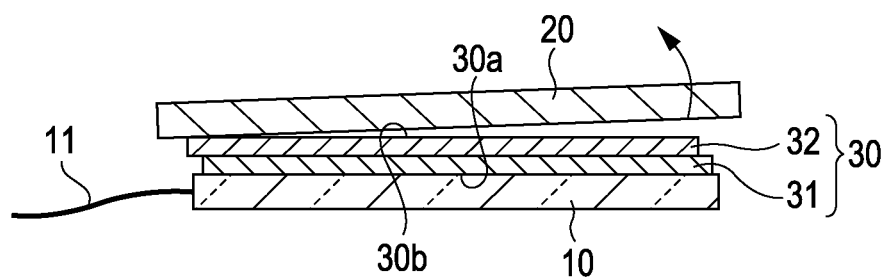
FIGS. 2A and 2B show the relationship between the removing direction and the interface at which the sheet is peeled in the case of the removal of the unit from the display module of the first embodiment.
Figure 2B:
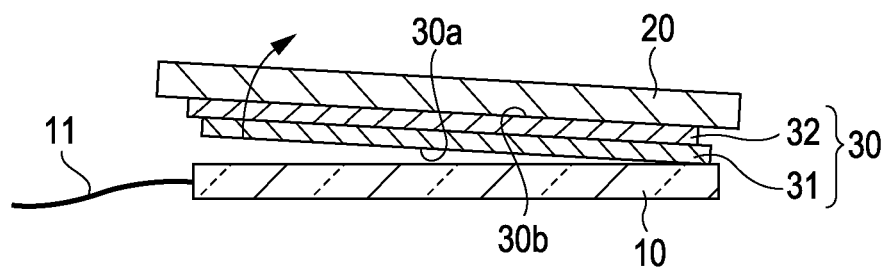

Next, the removal of the display panel 10 or the unit 20 from the display module 1 of the first embodiment will be described with reference to FIGS. 1A to 1D and 2A and 2B. FIGS. 2A and 2B show the state of the interface at which the sheet is peeled in the case of the removal of the display panel or the unit from the display module of the first embodiment. FIG. 2A is a schematic view in the case where the sheet is adhering to the display panel. FIG. 2B is a schematic view in the case where the sheet is adhering to the unit.

As described above, in the plan view of FIG. 1C, the corner A of the edge of the adhesive layer 32 adhering to the unit 20 is displaced obliquely upward, and the corner B of the edge of the adhesive layer 31 adhering to the display panel 10 is displaced obliquely downward.

As shown in FIG. 2A, by lifting up the unit 20 from the corner B with the display panel 10 supported, only the unit 20 can be removed with the adhesive sheet 30 adhering to the display panel 10 on which the adhesive layer 31 is located on the outer side in the adhesive surface direction. In the case of peeling from the corner B, the edge of the sheet 31 is adhering only to the display panel 10, and therefore peeling force is not applied thereto. On the other hand, the edge of the sheet 32 is sandwiched between the unit 20 and the sheet 31, and therefore peeling force is applied thereto. Thus, peeling starts at the interface between the sheet 32 and the unit 20. Once the adhesive sheet 30 starts peeling, peeling progresses gradually, and finally the adhesive sheet 30 peels entirely.

On the other hand, by lifting up the unit 20 from the corner A with the display panel 10 supported, only the display panel 10 can be removed with the adhesive sheet 30 adhering to the unit 20 on which the adhesive layer 32 is located on the outer side in the adhesive surface direction. As described above, by changing the point from which peeling is started, the side on which the adhesive sheet 30 remains can be controlled.

In the display module 1 of this embodiment, the adhesive sheet has a first adhesive surface adhering to the display panel and a second adhesive surface adhering to the unit, and the edge of the first adhesive surface and the edge of the second adhesive surface are displaced from each other in the adhesive surface direction. More specifically, in the part from which peeling is started, the adhesive sheet remains on the side where the adhesive surface extends to the outer side in the adhesive surface direction, and peels at the other interface. Therefore, if a display panel, protective panel, or touch panel unit (tablet unit) is damaged, only the damaged component can be peeled from the adhesive sheet 30 and replaced with a new one. That is to say, the member on which the adhesive sheet 30 remains can be selected, and the cost of replacement can be reduced. Thus, in the display module 1 of this embodiment, the adhesive sheet 30 can be cleanly peeled from one of the display panel 10 and the unit 20 while adhering to the other, and the display module 1 of this embodiment has a high level of visibility and is easy to assemble and disassemble.

In the present invention, not all edges of the adhesive surfaces need to be displaced. For example, at the left end of the sectional view of FIG. 1D, the edges of the sheets 31 and 32 are in alignment with each other, but at the right end of the sectional view of FIG. 1D, the edges of the sheets 31 and 32 are displaced from each other. In the case of such a structure, the advantageous effects of the present invention can also be obtained. By making the adhesive surface 30a of the sheet 31 on one of the display panel 10 and the unit 20 that is more prone to trouble (the display panel 10 in FIG. 1D) larger than the adhesive surface 30b of the sheet 32, the sheets 31 and 32 can be made to remain on the display panel 10, and the unit 20 can be reused.

Second Embodiment

Figure 3A:
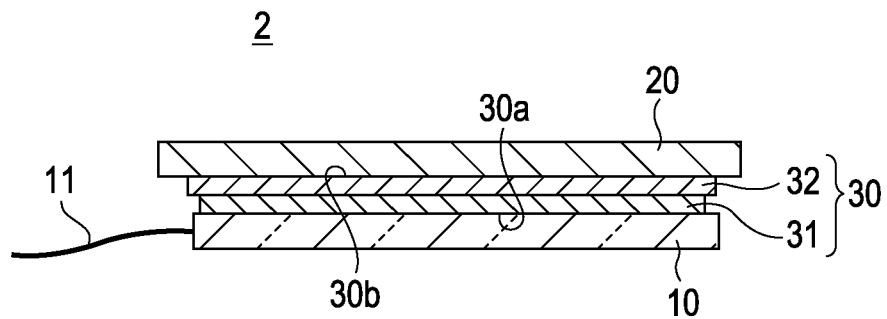
FIGS. 3A to 3C show a display module of a second embodiment.
Figure 3B:
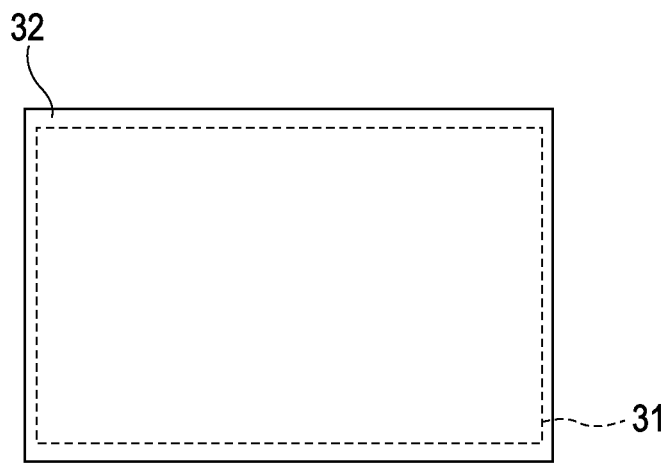
Figure 3C:
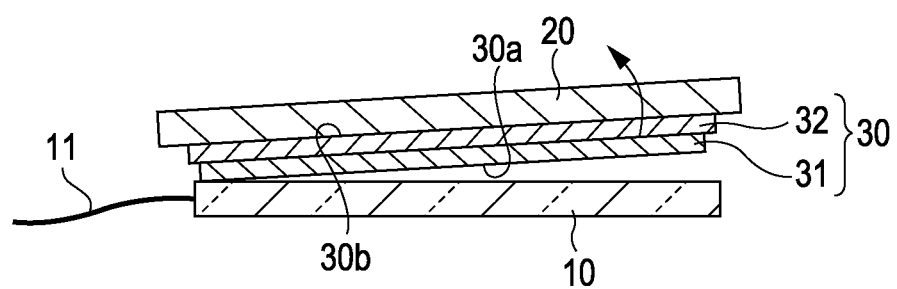

Next, a display module 2 according to a second embodiment will be described with reference to FIGS. 3A to 3C. FIGS. 3A to 3C show a display module of a second embodiment. FIG. 3A is a sectional view, FIG. 3B is a plan view showing the arrangement of two sheets, and FIG. 3C is a schematic view showing the state of the interface at which the sheet is peeled in the case of the removal of the display panel. In the description of this embodiment, the same reference numerals will be used to designate the same components as those in the first embodiment.

As shown in FIGS. 3A and 3B, in the second embodiment, an adhesive sheet 30 includes two sheets 31 and 32 stuck together (two-layered), and the area of the sheet 32 adhering to the unit 20 is larger than the area of the sheet 31 adhering to the display panel 10. As shown in FIGS. 3A and 3B, the two sheets 31 and 32 are arranged in such a manner that the four edges of the adhesive surface 30a of the sheet 31 are not in alignment with corresponding edges of the adhesive surface 30b of the sheet 32. Specifically, as shown in FIGS. 3A and 3B, the two sheets 31 and 32 are arranged in such a manner that the left, right, upper, and lower edges of the adhesive surface 30a of the sheet 31 are not in alignment with the left, right, upper, and lower edges of the adhesive surface 30b of the sheet 32. Therefore, in the two-layered adhesive sheet 30, the edge of the sheet (adhesive layer) 31 adhering to the display panel 10 and the edge of the sheet (adhesive layer) 32 adhering to the unit 20 are displaced from each other in the adhesive surface direction. That is to say, the four edges of the sheet 32 adhering to the unit 20 are located on the outer side in the adhesive surface direction of corresponding edges of the sheet 31 adhering to the display panel 10.

In the second embodiment, as shown in FIG. 3C, the unit 20 is lifted up from any one of the corners thereof, with the display panel 10 supported. So, the adhesive sheet 30 adheres to the unit 20 to which the larger sheet 32 is adhering, and only the display panel 10 can be removed.

The area of the sheet 31 adhering to the display panel 10 may be larger than the area of sheet 32 adhering to the unit 20. In this case, the unit 20 is lifted up from any one of the corners thereof, with the display panel 10 supported. So, the adhesive sheet 30 adheres to the display panel 10 to which the larger sheet 31 is adhering, and only the unit 20 can be removed.

In the second embodiment, basically the same advantageous effects as in the first embodiment can be obtained. However, the side on which the adhesive sheet 30 remains is determined by the element to which the larger sheet adheres. Therefore, the first embodiment is more flexible about removal work.

Third Embodiment

Figure 4A:
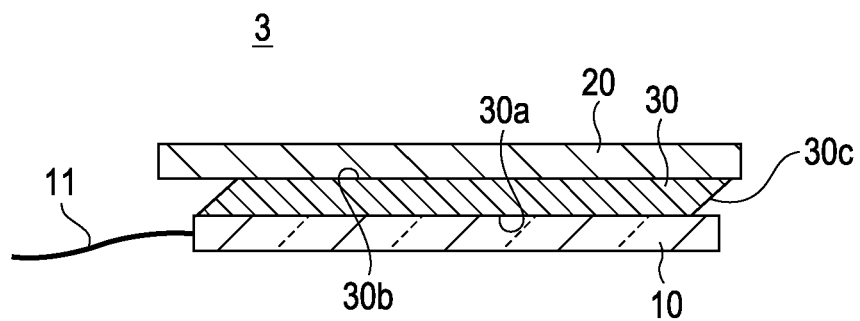
FIGS. 4A and 4B show a display module of a third embodiment.
Figure 4B:
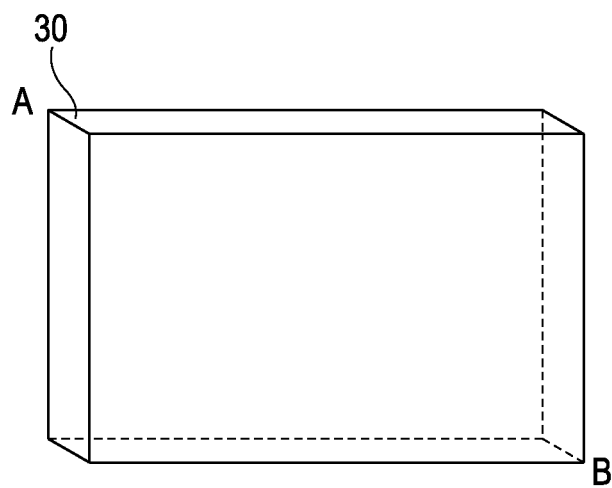
Figure 5A:
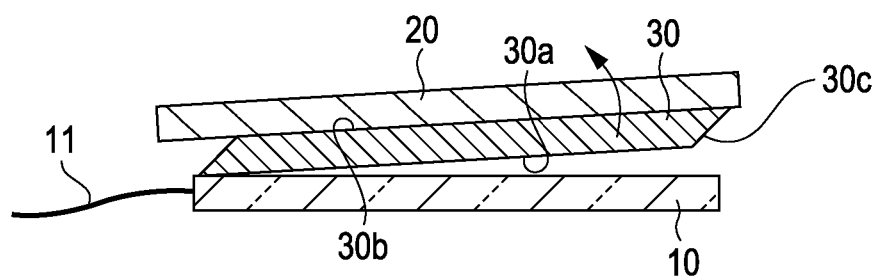
FIGS. 5A and 5B show the state of the interface at which the sheet is peeled in the case of the removal of the display panel or the unit from the display module of the third embodiment.
Figure 5B:
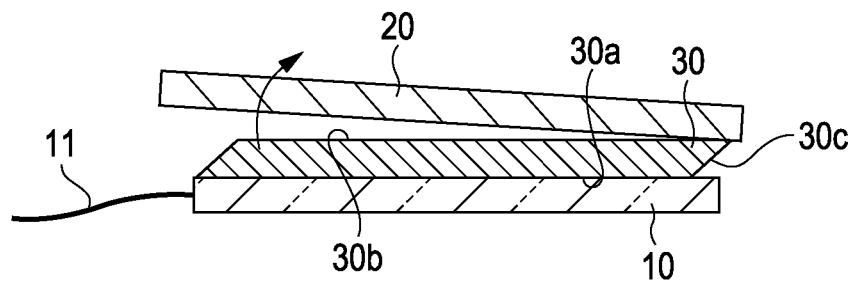

Next, a display module 3 according to a third embodiment will be described with reference to FIGS. 4A and 4B. FIGS. 4A and 4B show a display module of a third embodiment. FIG. 4A is a sectional view, and FIG. 4B is a plan view. FIGS. 5A and 5B show the state of the interface at which the sheet is peeled in the case of the removal of the display panel or the unit from the display module of the third embodiment. FIG. 5A is a schematic view in the case where the sheet is adhering to the unit. FIG. 5B is a schematic view in the case where the sheet is adhering to the display panel. In the description of this embodiment, the same reference numerals will be used to designate the same components as those in the first and second embodiments.

As shown in FIG. 4A, in the third embodiment, the edge surfaces 30c of a single-layer adhesive sheet 30 are cut diagonally in the thickness direction. That is to say, in the sectional view of FIG. 4A, the adhesive sheet 30 has a parallelogram shape, and the edge of a first adhesive surface 30a adhering to the display panel 10 and the edge of a second adhesive surface 30b adhering to the unit 20 are displaced from each other in the adhesive surface direction. As shown in FIG. 4B, in the adhesive sheet 30, adjacent long and short sides are formed in the same shape, the edge surfaces of opposed long sides are inclined so as to be parallel to each other, and the edge surfaces of opposed short sides are inclined so as to be parallel to each other. More specifically, at the right end of the sectional view of FIG. 4A, the adhesive surface 30b adhering to the unit 20 is located on the outer side in the adhesive surface direction, and at the left end of the sectional view of FIG. 4A, the adhesive surface 30a adhering to the display panel 10 is located on the outer side in the adhesive surface direction. In this embodiment, it is clear that the advantageous effects of the present invention can be obtained even if the sectional shape of the adhesive sheet is not a perfect parallelogram shape.

In the third embodiment, as shown in FIG. 5A, the unit 20 is lifted up from the corner B, with the display panel 10 supported. So, the adhesive sheet 30 adheres to the unit 20 on which the adhesive surface 30b is located on the outer side in the adhesive surface direction, and only the display panel 10 can be removed. On the other hand, as shown in FIG. 5B, the unit 20 may be lifted up from the corner A, with the display panel 10 supported. So, the adhesive sheet 30 adheres to the display panel 10 on which the adhesive surface 30a is located on the outer side in the adhesive surface direction, and only the unit 20 can be removed. As described above, by changing the point from which peeling is started, the side on which the adhesive sheet 30 remains can be controlled.

As described above, in the part from which peeling is started, the adhesive sheet 30 remains on the side where the adhesive surface extends to the outer side in the adhesive surface direction, and peels at the other interface. Therefore, two sheets are not essential. Even in the case of a single sheet, the object of the present invention can also be attained by devising the regions of the adhesive surfaces.

In the third embodiment, basically the same advantageous effects as in the first embodiment can be obtained. The third embodiment is flexible about removal work, like the first embodiment. In particular, the third embodiment has a single-layered adhesive sheet 30 and therefore has simple structure, and is advantageous in that production costs can be reduced.

While preferred embodiments of the present invention have been described above, it is to be understood that the embodiments described are illustrative only and the present invention may be embodied in other various forms without departing from the scope of the present invention.

The present invention does not depend on the type of the display panel 10, and therefore the display panel 10 can be selected from various display types such as liquid crystal display panels, organic light emitting diode display panels, electronic paper, field emission display panels, and plasma display panels (PDPs).

EXAMPLE

A display module according to the present invention will be described in more detail with an example. However, the present invention is not limited to this example.

Example 1

Figure 6A:
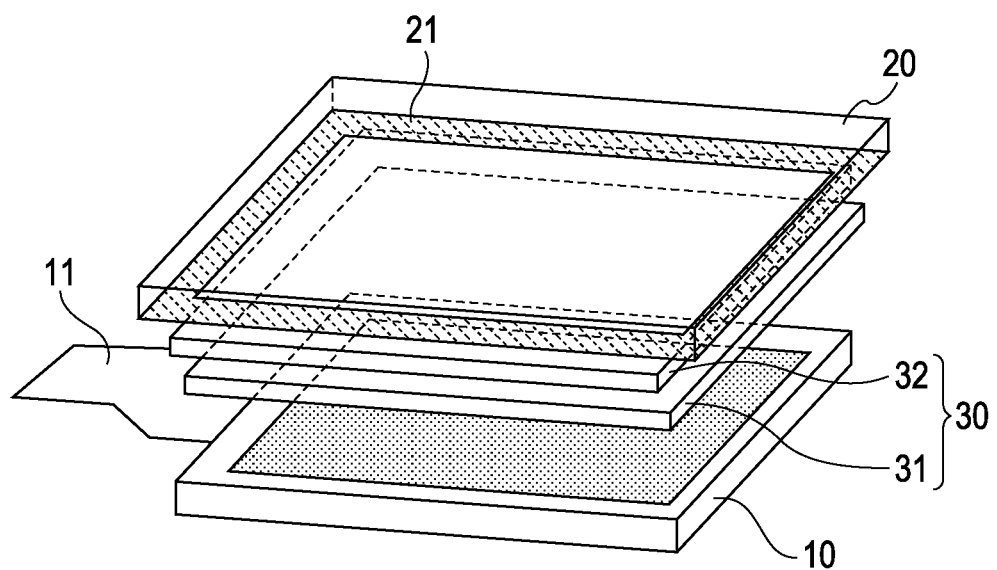
FIGS. 6A and 6B show an example in which the display module of the first embodiment is used as a display module for a digital camera.
Figure 6B:
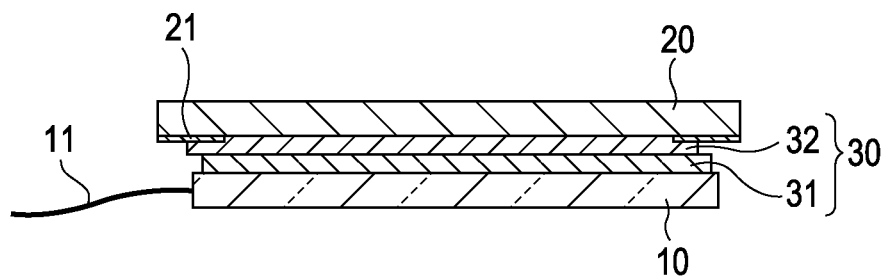

This example corresponds to the first embodiment. FIGS. 6A and 6B show an example in which the display module of the first embodiment is used as a display module for a digital camera. FIG. 6A is an exploded perspective view, and FIG. 6B is a sectional view.

As shown in FIG. 6A, in this example, two weakly adhesive transparent silicone sheets 31 and 32 are stuck together as an adhesive sheet 30 between a display panel 10 and a unit (transparent protective plate) 20. In this example, the sheets 31 and 32 have the same shape. However, they do not necessarily have to have the same shape. By sticking the sheets 31 and 32 together in such a manner that the sheets 31 and 32 are displaced from each other at a particular corner, a display module 1 having a cross-sectional structure shown in FIG. 6B is constructed.

A light-blocking frame 21 of black resin is printed on the edge of the protective plate 20 and there is a difference in level. However, such a difference in level is permissible because the two sheets 31 and 32 are silicone sheets having elasticity. When the sheet 32 adhering to the protective plate 20 is peeled, the sheet 32 is peeled from the part corresponding to the corner B (see FIG. 1C). On the other hand, when the sheet 31 adhering to the display panel 10 is peeled, the sheet 31 is peeled from the part corresponding to the corner A (see FIG. 1C).

Next, a process for making a two-layered adhesive sheet 30 will be described with reference to FIG. 7. FIG. 7 is an explanatory view showing a process for sticking adhesive sheets together. In FIG. 7, reference numeral 41 denotes a direction in which a pressure roller 40 presses, and reference numeral 42 denotes a direction in which a unit (protective plate) 20 is pressed.

As shown in FIG. 7, first, a separator 33 is peeled off from a silicone sheet 31, and then, using a rubber pressure roller 40 or the like, the silicone sheet 31 is stuck on a display panel 10 while pushing out air from the edge of the sheet 31. Similarly, a separator 33 is peeled off from another silicone sheet 32, and then, using a rubber pressure roller 40 or the like, the silicone sheet 32 is stuck on a protective plate 20 while pushing out air from the edge of the sheet 32.

Next, a separator 33 is peeled off from the sheet 31 stuck on the display panel 10, and a separator 33 is peeled off from the sheet 32 stuck on the protective plate 20. Then, by mechanically lifting up both ends of the protective plate 20 against which the rubber roller 40 is pressed, the protective plate 20 is bent upward. The sheet stuck on the display panel 10 and the sheet stuck on the protective plate 20 are made to face each other, and the middles of the sheets 31 and 32 are first stuck together. By gradually lowering both ends of the protective plate 20 while pressing with the rubber roller 40 from the middle to both end, the protective plate 20 and the display panel 10 are stuck together while pushing out air between the sheets stuck on the protective plate 20 and the display panel 10. As a result, a display module 1 in which the sheets 31 and 32 are stuck together with no air therebetween can be obtained.

Alternatively, a protective plate 20 on which a sheet 32 is stuck is disposed diagonally to a display panel 10 on which a sheet 31 is stuck in such a manner that first ends of the sheets 31 and 32 are in contact with each other. By pressing with a rubber roller 40 from the first end to the second end while gradually reducing the inclination angle, the protective plate 20 and the display panel 10 can be stuck together while pushing out air between the sheets 31 and 32.

If the protective plate 20 of the display module 1 obtained as described above is damaged and needs to be replaced, the display module 1 can be disassembled in such a manner that the adhesive sheet 30 remains on the display panel 10 or the protective plate 20.

After completion of peeling work, a new protective plate 20 is stuck on the adhesive sheet 30 remaining on the display panel 10. Alternatively, a transparent adhesive sheet is newly stuck on the adhesive sheet 30 remaining on the display panel 10, and a new protective plate 20 is stuck thereon. The refractive index of the transparent silicone sheet used as the adhesive sheet is about 1.5, and therefore the reflection of external light can be prevented, and the display module has a high level of visibility like conventional display modules.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-190064 filed Aug. 19, 2009, which is hereby incorporated by reference herein in its entirety.

What is claimed is:

1. A display module comprising:
a display panel;
a unit disposed on an outer side of the display panel; and
an adhesive layer disposed between the display panel and the unit,
wherein a first periphery of a first adhesive surface of the adhesive layer adhering to the display panel and a second periphery of a second adhesive surface of the adhesive layer adhering to the unit are displaced from each other in an adhesive surface direction,
wherein the adhesive surface direction is a direction parallel to the adhesive surfaces, and
wherein the first periphery adhering to the display panel is displaced obliquely downward and the second periphery adhering to the unit is displaced obliquely upward.

2. The display module according to claim 1, wherein the adhesive layer is formed by laminating a plurality of adhesive sheets.

3. The display module according to claim 2, wherein an adhesive sheet has a refractive index of approximately 1.5.

4. The display module according to claim 1, wherein the first periphery is displaced obliquely upward.

5. The display module according to claim 1, wherein the second periphery is displaced obliquely downward.

6. A display module comprising:
a display panel;
a unit disposed on an outer side of the display panel; and
an adhesive layer disposed between the display panel and the unit,
wherein a first periphery of a first adhesive surface of the adhesive layer adhering to the display panel and a second periphery of a second adhesive surface of the adhesive layer adhering to the unit are displaced from each other in an adhesive surface direction,
wherein the adhesive surface direction is a direction parallel to the adhesive surfaces, and
wherein the first periphery and the second periphery are not in alignment with each other.

7. The display module according to claim 6, wherein the adhesive layer is formed by laminating a plurality of adhesive sheets.

8. The display module according to claim 7, wherein an adhesive sheet has a refractive index of approximately 1.5.

9. The display module according to claim 6, wherein the first periphery is displaced obliquely upward.

10. The display module according to claim 6, wherein the second periphery is displaced obliquely downward.

* * * * *